United States Patent
Yamamoto et al.

[19]

[11] Patent Number: 5,975,562
[45] Date of Patent: *Nov. 2, 1999

[54] STEERING WHEEL WITH INTEGRAL AIR BAG PAD

[75] Inventors: Tadashi Yamamoto, Aichi-ken; Katsunobu Sakane, Ichinomiya; Akio Hosoi, Komaki; Atsushi Nagata, Inazawa, all of Japan

[73] Assignee: Toyoda Gosei Co., Ltd., Aichi-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/827,182

[22] Filed: Mar. 27, 1997

[30] Foreign Application Priority Data

Mar. 27, 1996 [JP] Japan ................................. 8-072136

[51] Int. Cl.⁶ .................................................. B60R 21/20
[52] U.S. Cl. ...................................... 280/728.3; 280/731
[58] Field of Search .............................. 280/731, 728.3, 280/728.2

[56] References Cited

U.S. PATENT DOCUMENTS

| | | | |
|---|---|---|---|
| 4,852,907 | 8/1989 | Shiraki et al. | 280/731 |
| 5,118,132 | 6/1992 | Nakajima | 280/731 |
| 5,560,264 | 10/1996 | Xolin et al. | 280/731 |
| 5,615,910 | 4/1997 | Margetak et al. | 280/731 |
| 5,676,396 | 10/1997 | Fohl | 280/731 |
| 5,720,494 | 2/1998 | Hosoi et al. | 280/731 |
| 5,727,811 | 3/1998 | Nagata et al. | 280/731 |

FOREIGN PATENT DOCUMENTS

| | | |
|---|---|---|
| 0397154 | 11/1990 | European Pat. Off. . |
| 0781688 | 7/1997 | European Pat. Off. . |
| 3811373 | 10/1988 | Germany . |
| 2-133955 | 5/1990 | Japan . |
| 2-133955 U | 11/1990 | Japan . |
| 2239434 | 7/1991 | United Kingdom . |

OTHER PUBLICATIONS

Patent Abstracts of Japan vol. 017, No. 168 (M–1391), Mar. 31, 1993 & JP 04 328056 A (Toyoda Gosei Co Ltd), Nov. 17, 1992.

Patent Abstracts of Japan vol. 018, No. 098 (M–1562), Feb. 17, 1994 & JP 05301557A (Toyoda Gosei Co Ltd), Nov. 16, 1993.

*Primary Examiner*—Peter C. English
*Attorney, Agent, or Firm*—Pillsbury Madison & Sutro

[57] ABSTRACT

A steering wheel has a steering wheel body which includes a boss for being fixed to a steering shaft, a ring portion metal core, spoke portion metal cores, a covering portion covering the ring portion metal core and the spoke portion metal cores, and a pad portion provided generally centrally of a ring portion, the pad portion being molded integrally with the covering portion. The steering wheel further includes an air bag device provided between the pad portion and the boss. A cloth insert is mounted on a metal core portion, forming part of the steering wheel body, and is embedded in the pad portion so that the insert can flex when the air bag device is expanded.

12 Claims, 7 Drawing Sheets

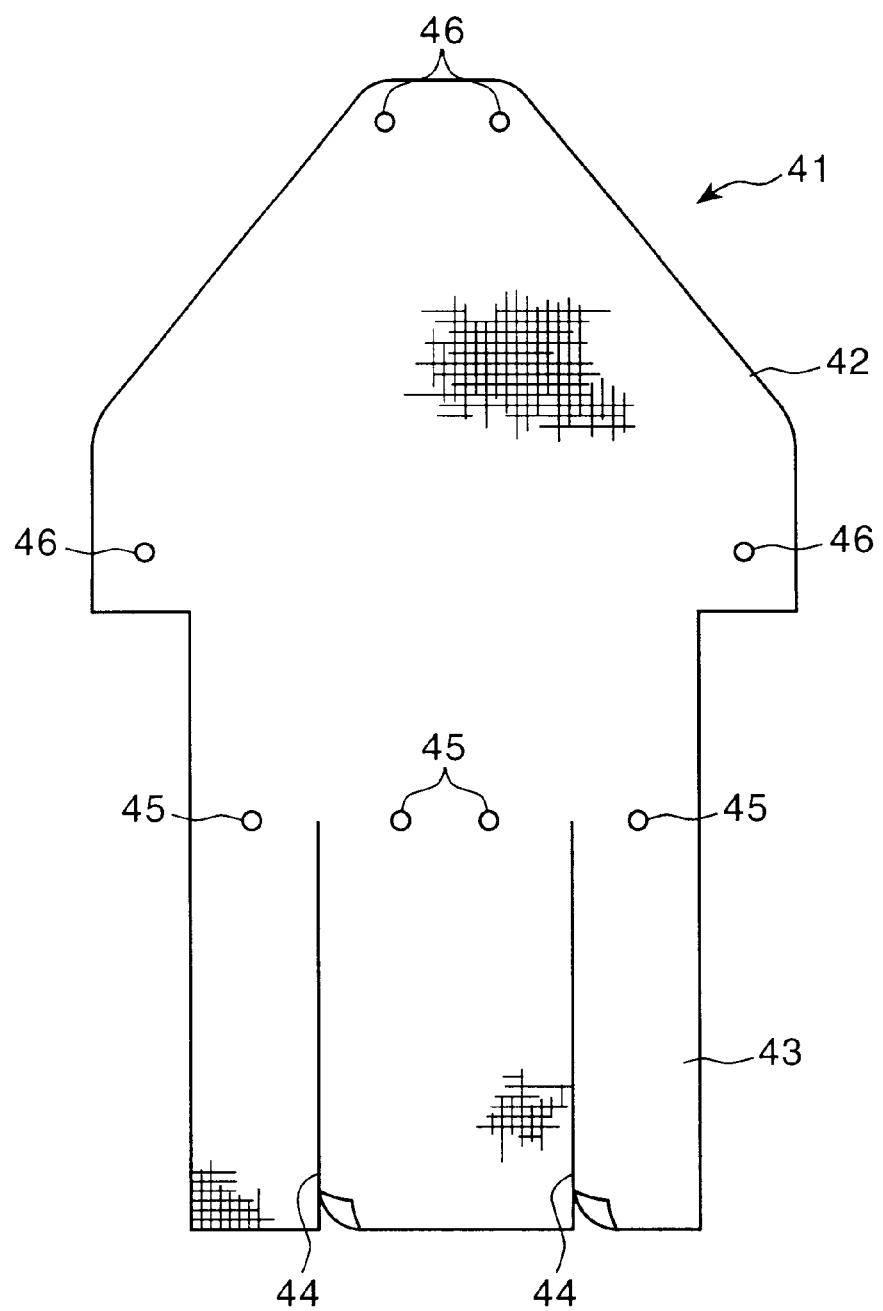

STEERING WHEEL WITH INTEGRAL AIR BAG PAD

BACKGROUND OF THE INVENTION

1. Field of the Invention

This invention relates to a steering wheel in which a pad portion is formed integrally with the remaining covering portion of the steering wheel.

2. Discussion of Prior Art

Generally, a steering wheel comprises an annular ring portion, a pad portion, provided generally centrally of the ring portion, and a plurality of spoke portions extending from the ring portion toward the center of the ring portion. A ring portion metal core is embedded in the ring portion, and a spoke portion metal core is embedded in each of the spoke portions. The ring portion metal core and the spoke portion metal cores are covered with a covering portion made, for example, of a foamed polyurethane. A boss plate for mounting the steering wheel to a steering shaft is connected to the spoke portion metal cores at a position beneath the pad portion.

Recently, there has been proposed a type of steering wheel (Japanese Utility Model Unexamined Publication No. 2-133955) where the covering and pad portions are molded integrally with each other, thereby eliminating the boundaries between the covering portion and the pad portion. With this arrangement, the covering portion and the pad portion are integral with each other, thereby enhancing the design of the steering wheel. In the steering wheel disclosed in the above publication, in order to prevent the pad portion from being broken apart and being scattered when an air bag device is operated, an insert is embedded in the pad portion. The insert is fixed to a foamed resin member formed on the metal core.

In the above conventional steering wheel, however, because the insert is fixed to the foamed resin member, when the pad portion opens upon expansion of the air bag, there is a possibility that the insert may disengage from the fixing portion, so that the pad portion, the foamed resin member for fixing purposes, and other pieces are scattered.

SUMMARY OF THE INVENTION

With the above problems in view, it is an object of this invention to provide a steering wheel with an air bag, in which an insert, embedded in a pad portion, will not disengage from the steering wheel.

According to the present invention, the steering wheel including a steering wheel body, includes a boss for being fixed to a steering shaft, a ring portion metal core, spoke portion metal cores, a covering portion covering both the ring portion metal core and the spoke portion metal cores, and a central pad portion that is molded integrally with the covering portion.

An air bag device is provided between the pad portion and the boss.

A flat insert of a flexible material is mounted on the metal core portion, forming part of the steering wheel body, and is embedded in the pad portion so that the insert moves or flexes when the air bag device operates.

Preferably, the insert is folded around the metal core portion and overlapped upon itself to provide a double hinge portion, with the overlapped portions being joined together.

Preferably, the insert comprises a cloth or fabric, and the upper and lower overlapped portions are sewn together.

The pad portion includes a notch on the under side for assisting opening of the pad as the air bag device expands. Also, the insert includes a larger portion having a peripheral edge extending along the notch portion, and a smaller portion folded upon the larger portion. Preferably, the larger portion of the insert is disposed below the smaller portion.

In this specification, reference to "upward and downward directions" with respect to a steering wheel mean "a direction along the axis of a steering shaft", and does not mean upward and downward directions when the steering wheel is mounted on a vehicle.

In the present invention, since the insert, embedded in the pad portion, is mounted on the metal core portion constituting part of the steering wheel body, the insert will not be disengaged from the steering wheel when the air bag is expanded. Therefore, the scattering of the pad portion, molded of polyurethane or the like, is positively prevented. Since the insert comprises a flat, flexible material, the softness or flexibility of the pad portion remains.

In one preferred form of the invention, the insert is folded around the metal core portion and back upon itself to provide the double hinge portion, and the overlapped portions of the insert are joined together. Therefore, when the insert is generally pivotally moved through the hinge portion upon expansion of the air bag, the insert will not be disengaged from the metal core portion of the steering wheel portion, and thereby provide a steering wheel having a highly-reliable air bag device. If the insert folded upon itself comprises a cloth, and the upper and lower overlapped portions are sewn together, then the overlapped portions of the folded cloth insert can be joined together more easily.

In another preferred form of the invention, one half portion of the insert, on which the other half portion is superposed or overlapped, is defined by the larger portion corresponding to an openable portion (which can be opened along the notch portion) of the pad portion, while the other half portion is defined by the smaller portion. This construction minimizes the material required for forming the insert thus reducing costs.

In a further preferred form of the invention, the larger portion of the insert is disposed below the smaller portion. With this arrangement, stresses applied by air bag expansion, acts on the larger portion of the insert. Therefore, even where excessive stress instantaneously acts on the pad portion, the joined portion of the insert will not be pulled apart.

As described above, in the steering wheel with the air bag according to the present invention, there is achieved an excellent advantageous effect that the insert, embedded in the pad portion, will not be disengaged from the steering wheel.

BRIEF DESCRIPTION OF THE DRAWINGS

FIG. 4 is a perspective view showing a structure including metal cores, a boss and so on;

FIG. 6 is a fragmentary, plan view showing a yoke portion and so on;

FIG. 7 is a plan view showing the configuration of a cloth insert;

PREFERRED EMBODIMENT OF THE INVENTION

One preferred embodiment of the present invention will now be described with reference to the drawings.

Figure 1:
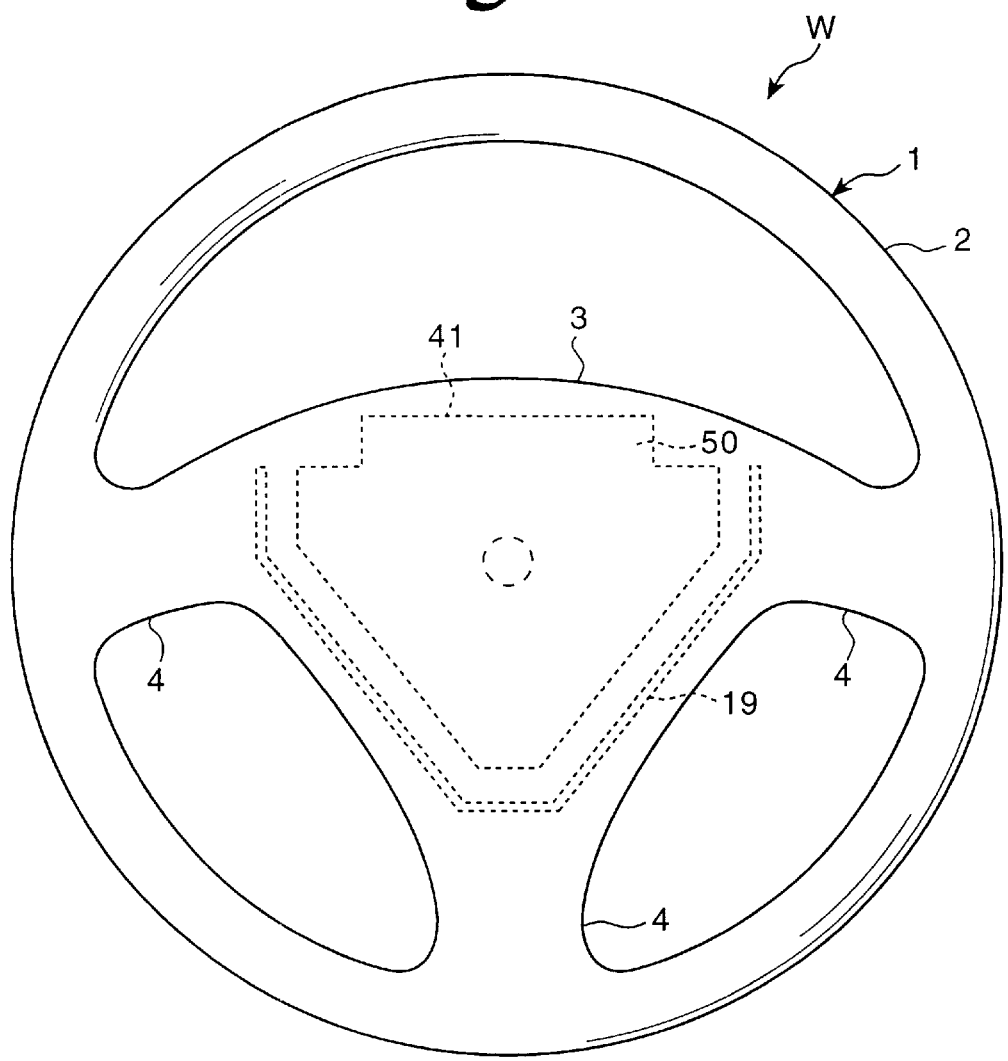
FIG. 1 is a front-elevational view of a preferred embodiment of a steering wheel of the present invention.
Figure 2:
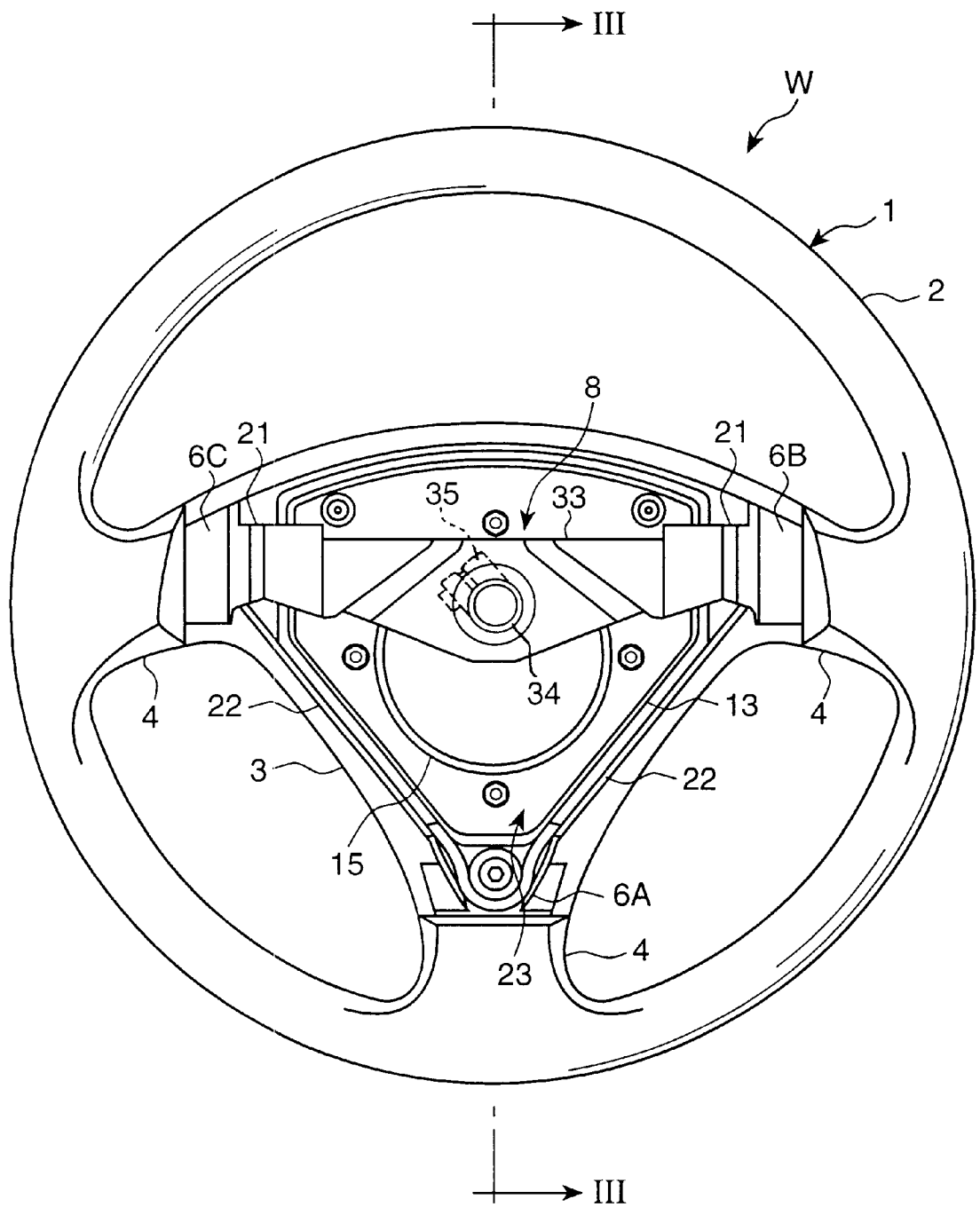
FIG. 2 is a back view of the steering wheel.
Figure 3:
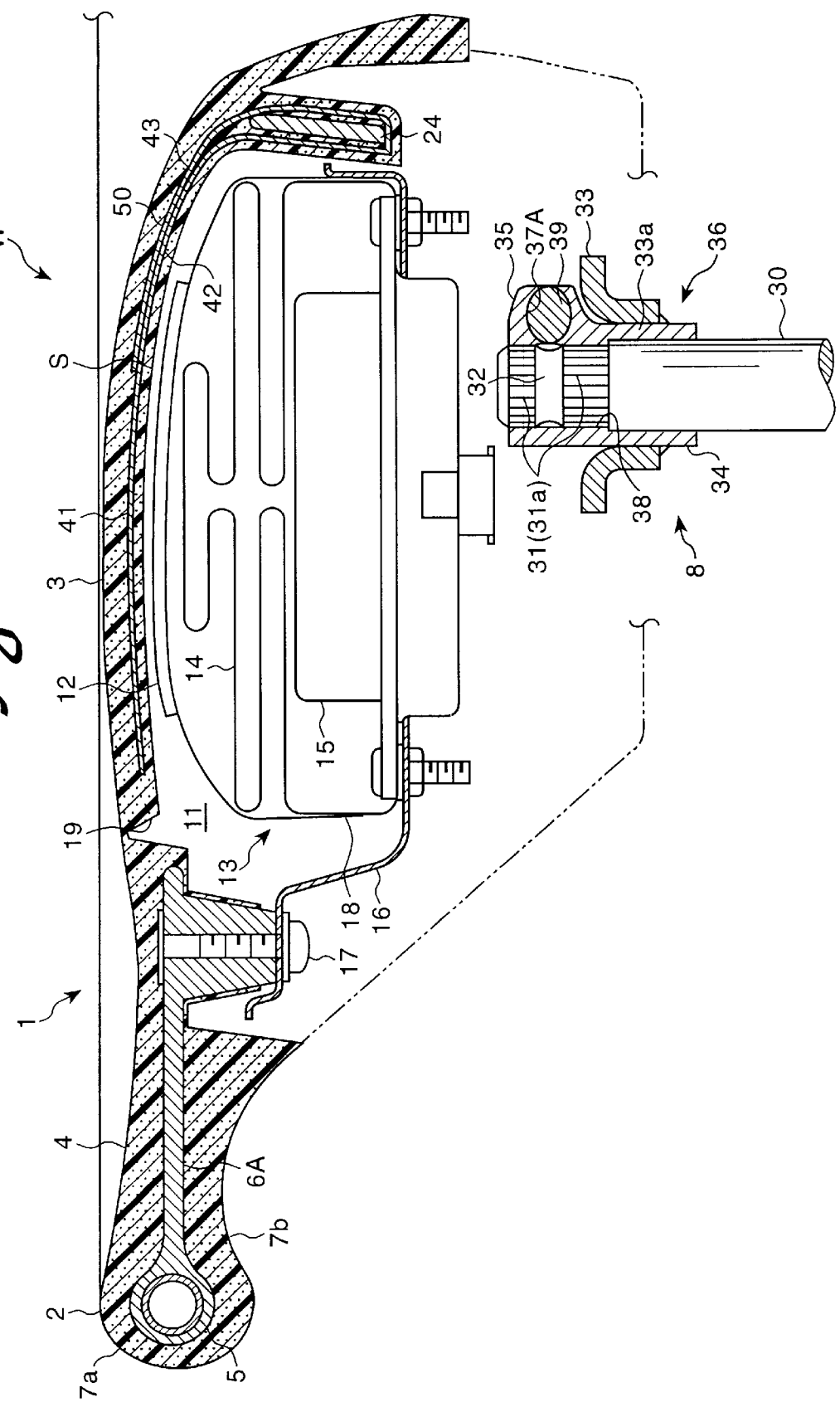
FIG. 3 is a cross-sectional view taken along the line III—III of FIG. 2.

As shown in FIGS. 1–3, a steering wheel body 1 of the steering wheel W comprises an annular ring portion 2, a pad portion 3, located generally centrally of the ring portion 2, and three spoke portions 4 extending inwardly from the ring portion 2.

The ring portion 2 includes a metal core 5, made for example of steel, and a covering portion 7a covering this metal core 5. The spoke portions 4 also include metal cores 6A, 6B and 6C (made of lightweight diecast metal such as aluminum alloy), respectively, and covering portions 7b, respectively. The covering portion 7a, the covering portions 7b and the pad portion 3 are all formed or molded from a soft synthetic resin material (e.g. foamed polyurethane) integrally with one another. The steering wheel body 1 is itself secured to a boss 8. This mounting structure will be described later.

A reception recess 11 is formed along the underside of the pad portion 3, and is generally surrounded by the covering portions 7b. A membrane switch 12, serving as a horn mechanism, and an air bag device 13 are mounted in this reception recess 11. The membrane switch 12 comprises upper and lower thin plates constituting part of a horn switch circuit (not shown), and when the pad portion 3 is pressed, the upper and lower thin plates are brought into contact with each other, thereby operating the horn to produce a sound.

The air bag device 13 comprises an air bag 14 held in a folded condition, an inflator 15 for supplying expansion gas to the air bag 14, and a bag holder 16 for holding and fixing the air bag 14 and the inflator 15 to the steering wheel body 1 by screws 17. The air bag 14 and the inflator 15 are covered with an air bag cover 18 which can be broken when the air bag 14 is expanded, and the membrane switch 12 is fixedly secured to an upper surface of the air bag cover 18.

In this embodiment, the pad portion 3 has a generally inverted triangular shape as shown in FIG. 1. A notch portion or groove 19 is formed in the lower surface of the pad portion 3, and extends along two sides of the triangular pad portion 3 (see FIG. 3). When the air bag 14 is expanded, this notch portion 19 is sheared allowing the pad portion 3 to be opened upwardly.

Figure 4:
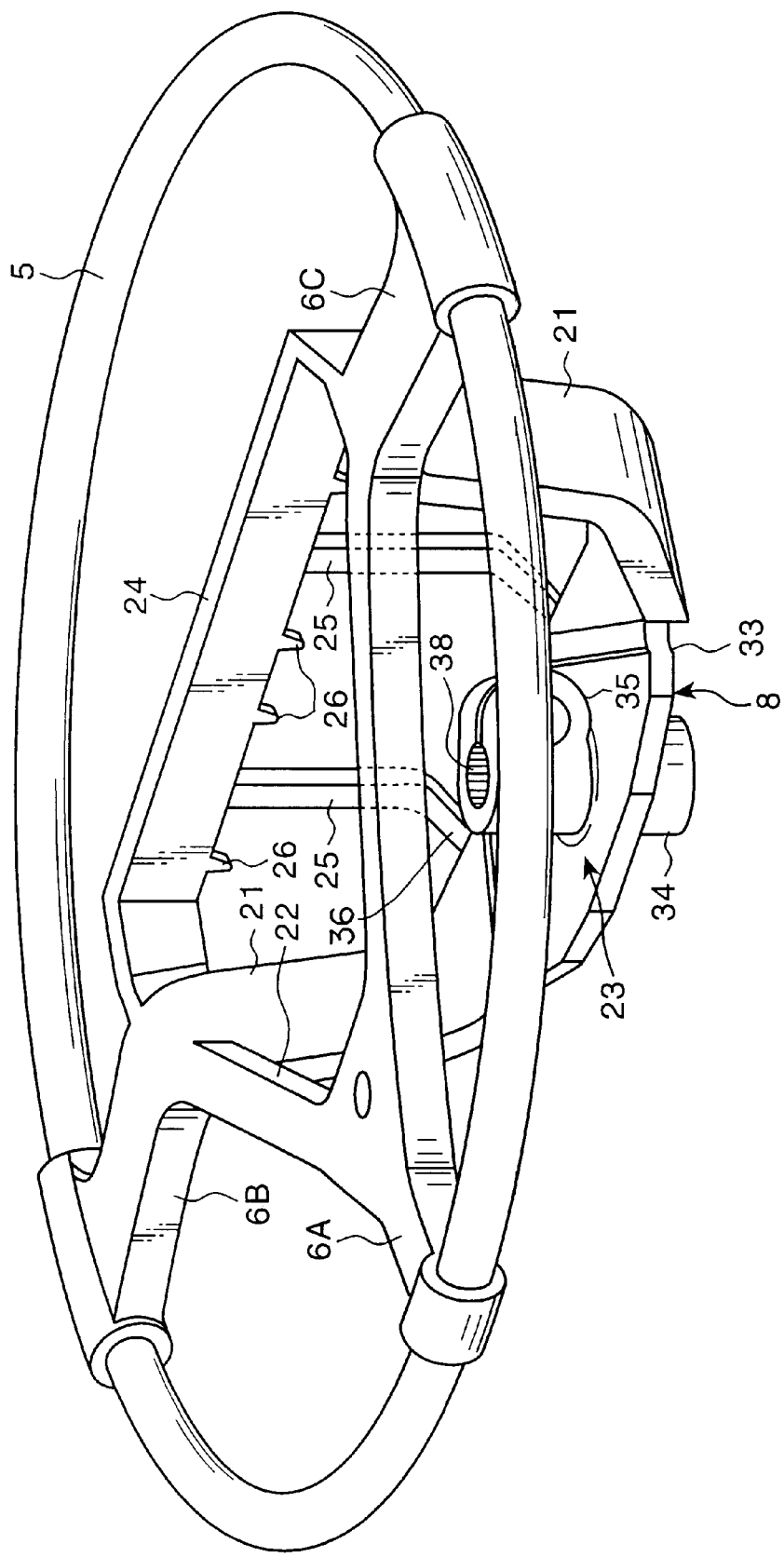
Figure 5:
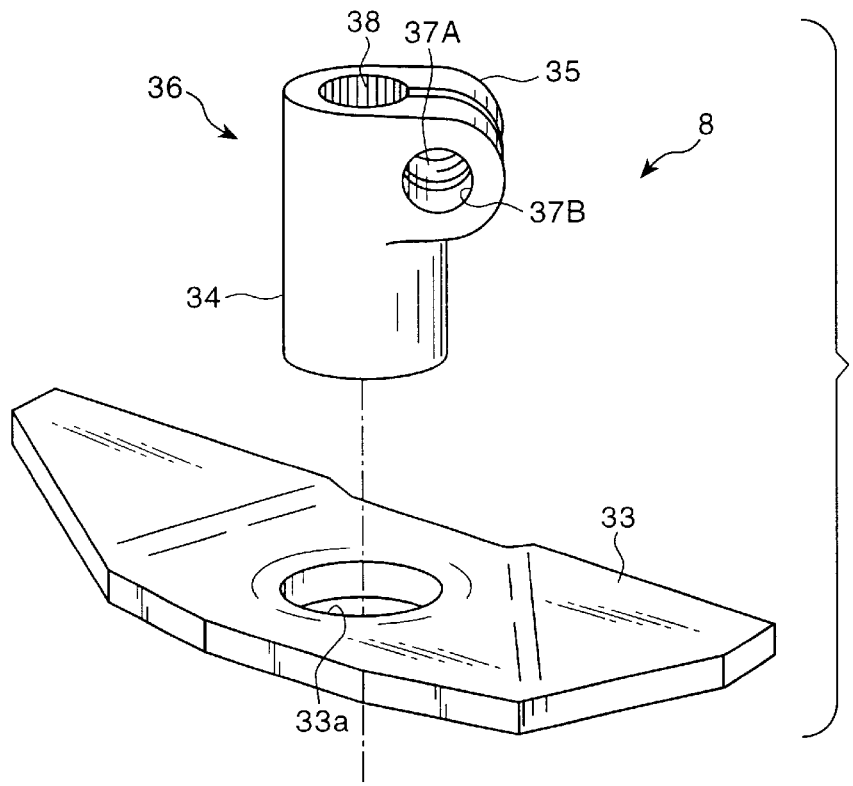
FIG. 5 is an exploded, perspective view explanatory of the manner of connecting a boss body to a boss plate.

The boss 8 is formed integrally with the steering wheel body 1, and more specifically with the spoke portion metal cores 6A to 6C. Boss 8 is connected integrally to the right and left spoke portion metal cores 6B and 6C through respective connecting portions 21, as shown in FIG. 4. The ring portion metal core 5, shown in FIG. 4, can be said to define a region or a plane which contains the ring portion metal core 5. Boss 8 is disposed at a level below the region or plane defined by the ring portion metal core 5 and the spoke portion metal cores 6B and 6C.

The spoke portion metal cores 6B and 6C are connected to the other spoke portion metal core 6A (facing a driver's seat) through respective auxiliary connecting portions 22. With this construction, the spoke portion metal cores 6A to 6C are firmly connected to both the ring portion metal core 5 and the boss 8. A relatively large opening 23, open to the driver's seat, is formed by the boss 8, the connecting portions 21 and the auxiliary connecting portions 22. The spoke portion metal cores 6B and 6C are connected together at their upper sides by a support bar metal core 24, thereby ensuring safety when the air bag 14 is expanded. The support bar metal core 24 is bent or shaped to extend away from the spoke portion metal core 6A to provide a large opening at a central portion of the steering wheel.

In this embodiment, a lower cover (not shown), made of a resin, is provided to cover the lower side of the steering wheel body 1.

Next, the mounting structure for the steering wheel W will be described with reference to FIGS. 3 to 6.

As shown in the drawings, a serrated portion 31 is formed at a distal end portion of a steering shaft 30, and an annular groove 32 is formed in the serrated portion 31 intermediate opposite ends (upper and lower ends) thereof. The serrated portion 31 of the steering shaft 30 has a predetermined number (for example, about 30) of serrations or teeth 31a.

Figure 6:
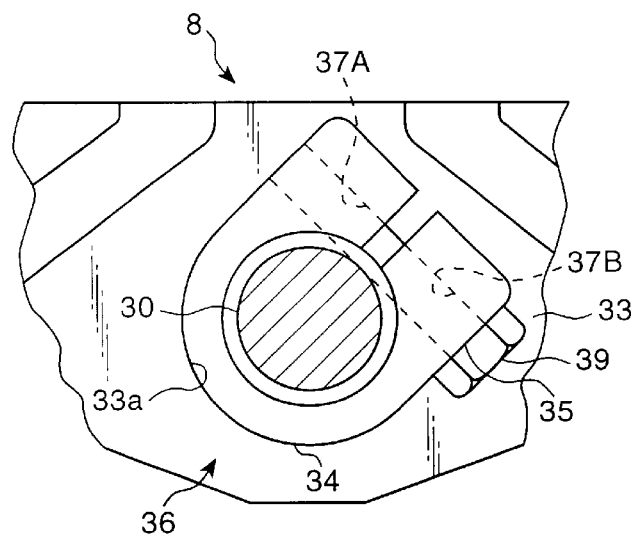

The boss 8 comprises a boss plate 33 having a through hole 33a formed through a central portion thereof. A boss body 36, which includes a tubular portion 34 of steel, is placed in the through hole 33a and welded to the boss plate 33. A yoke portion 35, formed at an upper end of the tubular portion 34, has a generally C-shape when viewed from the top. Bolt holes 37A and 37B, having different inner diameters, respectively, are formed through a bifurcated distal end portion of the yoke portion 35. Internal threads are formed on an inner surface of the bolt hole 37A smaller in inner diameter than the other bolt hole 37B. A serrated portion 38, corresponding to the serrated portion 31 of the steering shaft 30, is formed on an inner peripheral surface of the tubular portion 34. The tubular portion 34 is inserted over the distal end portion of the steering shaft 30, with the serrated portions 31 and 38 meshing with each other. A bolt 39 extends through the bolt hole 37B, and is threaded into the bolt hole 37A of a smaller inner diameter, as shown in FIG. 6.

Figure 8A:
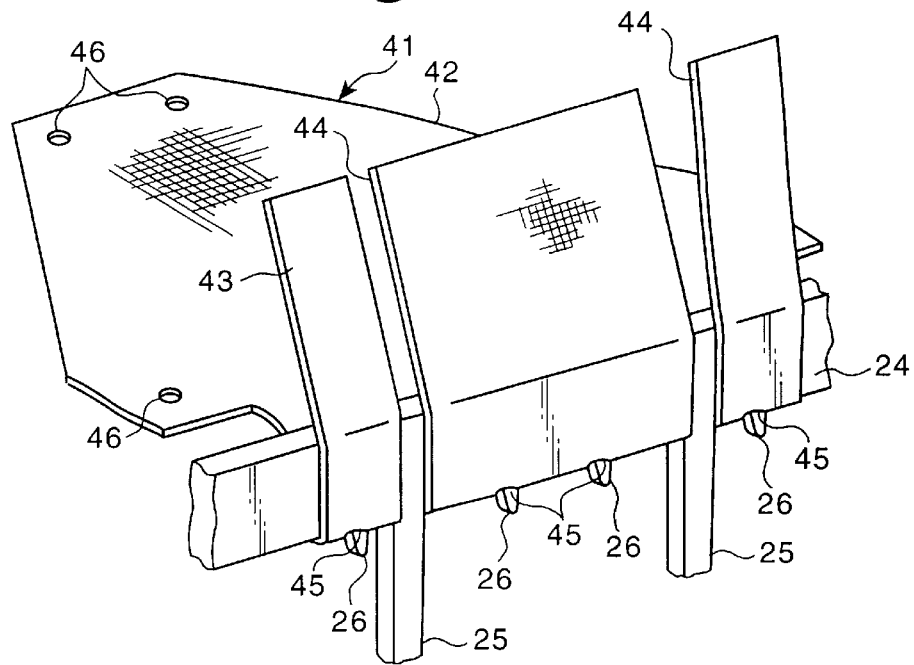
FIG. 8A is a perspective view showing the process of attaching the cloth insert to a support bar metal core.
Figure 8B:
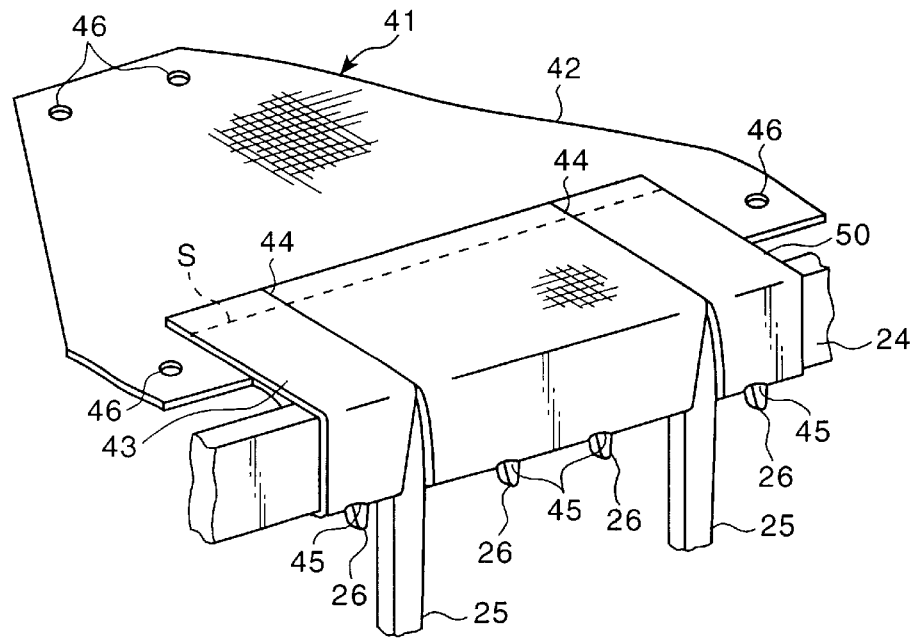
FIG. 8B is a perspective view showing a condition in which the cloth insert is folded back at its distal end portion around the support bar metal core, and is secured thereto by sewing the distal end of the cloth insert.

The opposite ends of the boss plate 33 are embedded in the spoke portion metal cores 6A to 6C of diecast aluminum, and specifically in the connecting portions 21, respectively. With this embedded arrangement, boss 8 is connected to the spoke portion metal cores 6A to 6C. For embedding the boss plate 33 in the spoke portion metal cores, the boss body 36 will have been previously welded to the boss plate 33 to form the boss 8, and then the boss 8 and the separate ring portion metal core 5 are each set in a casing mold. Then, molten aluminum is poured into a cavity in the casting mold which, when cooled and solidified, constitutes the spoke portion metal cores 6A to 6C, the connecting portions 21, the auxiliary connecting portions 22, and the support bar metal core 24 of the steering wheel. At this time, the support bar metal core 24 is connected to the lower ends of the connecting portions 21 by two reinforcement bars or posts 25. Also, four downwardly extending projections 26 are formed on the lower surface of the support bar metal core 24. The projections 26 and the support bar metal core 24 form an attachment portion and provide structure for a cloth insert 41 to be attached to the support bar metal core 24. This is illustrated in FIGS. 8A and 8B. This attachment portion is positioned relatively near the plane defined by the ring portion metal core 5, as is illustrated in FIG. 4.

An insert 41, which is made of a flexible material such as nylon 6,6 and polyester, and is, for example, in the form of cloth or fabric, is mounted on the support bar metal core 24. This cloth insert 41 is embedded in the pad portion 3 in such a manner that its peripheral edge extends along the notch portion 19 formed in the pad portion 3 (as shown in FIG. 1). The detailed construction of the cloth insert 41, as well as a method of mounting it, will now be described with reference to the drawings.

A piece of cloth will first be cut into the shape shown in FIG. 7 from which the cloth insert 41 will be formed. In this embodiment, cloth for forming an air bag base is used for forming the cloth insert 41. As shown in FIG. 7, the cloth insert 41 includes a triangular portion 42, corresponding in shape to the notch portion 19 formed in the pad portion 3, and a winding or wrapping portion 43 for being wound around the support bar metal core 24. In this embodiment, the triangular portion 42 defines a larger portion, and a distal end portion of the winding portion 43 defines a smaller portion. Two cut lines 44 are formed through the winding portion 43, and extend along more than one half the length thereof. Four positioning holes 45 are also formed through the winding portion 43. Mold-setting holes 46, of a small diameter, are formed through several distal end portions of the triangular portion 42.

The cloth insert 41 is attached to the support bar metal core 24 of diecast aluminum in the following manner. First, the winding portion 43 of the cloth insert 41 is wound on the support bar metal core 24, as shown in FIG. 8A. The reinforcement bars 25 pass, respectively, through the cut lines 44 in the cloth insert 41, and also the projections 26 pass, respectively, through the positioning holes 45 in the cloth insert 41.

Thereafter, the distal end of the winding portion 43 is superposed or overlapped on the triangular portion 42, and these superposed portions are sewn together by a sewing machine or the like, as shown in FIG. 8B. Reference character S denotes a line of stitches. At this time, the distal end of the winding portion 43 is disposed above the triangular portion 42, and is so superposed on the triangular portion 42 that a hinge portion 50 is formed at an upper edge of the support bar metal core 24.

Then, the thus prepared assembly shown in FIG. 8B is set in a mold (not shown). The cloth insert 41 is set in place in the mold, using the mold-setting holes 46, and the pad portion 3 and the covering portions 7a and 7b are integrally molded with one another for example, using urethane. As a result, the steering wheel body 1, having the cloth insert 41 embedded in the pad portion 3, is produced.

Thereafter, the steering wheel body 1 is mounted on the steering shaft 30 according to a predetermined procedure. More specifically, an assembly, comprising the membrane switch 12 and the air bag device 13, is inserted into the steering wheel body 1 through the opening 23 formed by the boss 8, the connecting portions 21 and the auxiliary connecting portions 22. Then, the bag holder 16 of the air bag device 13 is secured to the spoke portion metal core 6A and other portions by screws 17. In this embodiment, the bag holder 16 is fixed to three portions. Since opening 23 is relatively large, the air bag device 13 can be easily mounted in the steering wheel body 1.

Then, the boss 8 (e.g., the boss body 36), integrally connected to the steering wheel body 1, is placed on the distal end portion of the steering shaft 30. The serrated portion 31, formed on the steering shaft 30, meshes with the serrated portion 38 formed on the tubular portion 34 of the boss body 36. Then, in this condition, the bolt 39 is threaded into the bolt holes 37A and 37B in the boss body 36, thereby fixing the boss 8 to the steering shaft 30. Since boss 8 is connected to the steering wheel body 1 through spoke portion metal cores 6B and 6C, and the connecting portions 21, when the boss 8 is fixed to the steering shaft 30, the steering wheel body 1, including the membrane switch 12 and the air bag device 13, are also fixed to the steering shaft 30 at the same time.

This embodiment, described above in detail, achieves the following advantageous effects:

(a) The cloth insert 41 is wound on the support bar metal core 24, and the superposed or overlapped portions of the cloth insert 41 are sewn together forming a double hinge portion 50. Therefore, when the air bag 14 is expanded, the pad portion 3 is opened through the double hinge portion 50 constituted by the superposed portions of the cloth insert 41. The cloth insert 41 will not become disengaged from the support bar metal core 24, and therefore, provides a steering wheel W with a highly-reliable air bag device. Further, when the air bag is expanded, the pad portion 3, molded of polyurethane or the like, is prevented from breaking apart or being scattered. The sewing or connecting of the overlapped portions of cloth insert 41 can be effected easily and positively by a sewing machine or the like.

(b) The cloth insert 41 includes the triangular portion 42 corresponding in shape to the openable portion, which can be opened along the notch portion 19 of the pad portion 3, and the winding portion 43, having a reduced width, is superposed on part of the triangular portion 42. In this case, the material required for forming the cloth insert 41 can be kept to a minimum, so that costs are reduced. Particularly in this embodiment, the cloth insert 41 is formed using remaining portions of the cloth used for forming the air bag base cloth, thereby further reducing costs.

(c) The cloth insert 41 is folded back upon itself in such a manner that the triangular portion 42 is disposed at the lower side to face the air bag device 13 while the distal end portion of the winding portion 43 is disposed at the upper side. Therefore, when the air bag device 13 is expanded, a stress, applied by the expanded air bag 14, acts on the triangular portion 42 of the cloth insert 41 and specifically, on the triangular portion 42 adjacent hinge portion 50. Therefore, even if an excessive stress instantaneously acts on the pad portion 3, the joined portion of the cloth insert will not be disengaged from the support bar metal core 24.

(d) The projections 26 are formed on the support bar metal core 24, and the positioning holes 45, that fit on projections 26, are formed through the cloth insert 41. Therefore, when the air bag is expanded, the cloth insert 41, wound on the support bar metal core 24, is retained securely and prevented from being displaced out of position because of the retaining effect achieved by projections 26 and positioning holes 45. Another advantage of this arrangement is that when molding the pad portion of urethane, the cloth insert 41 is also prevented from being displaced out of position. Further, stresses, developing upon expansion of the air bag, are absorbed and resisted by the above retaining effect, so that the cloth insert 41 is prevented from being disengaged from the support bar metal core 24.

(e) In this embodiment, the relatively soft or flexible cloth insert 41 is embedded in the pad portion 3, and therefore the softness of the pad portion 3 is secured. As a result, the force required to press the horn is reduced as compared with constructions where an insert, made of a resin material, is embedded, and therefore horn operation is enhanced.

The present invention is not to be limited to the above embodiment, and for example, the following modifications can be made:

(1) In the above embodiment, although the superposed or overlapped portions of the cloth insert 41 are joined together by sewing, the superposed portions may be joined together by an adhesive or by fusion techniques.

(2) In the above embodiment, although the cloth insert is formed by cutting air bag base cloth, the cloth insert can be formed by any suitable flexible cloth.

(3) The cloth insert may have such a configuration that upper and lower superposed portions of the cloth insert have the same shape (triangular shape), and are sewn together. In this case, the pad portion 3 has a suitable degree of rigidity while assuring softness of the pad portion 3.

(4) Although the above embodiment is directed to the steering wheel W having the three spokes, the steering wheel may have any other suitable configuration, such as a two-spoke type and a four-spoke type. In such a case, the cloth insert is cut into a shape corresponding to the shape of a notch portion (at which the pad portion is broken upon expansion of the air bag) in the pad portion, and is embedded in the pad portion by molding.

For example, in a steering wheel with an air bag, which has a H-shaped notch portion formed in a central portion of a pad portion, two (upper and lower) cloth inserts are embedded in the pad portion. In this case, there are provided two metal core portions for fixing the two cloth inserts thereto, respectively. Namely, these metal core portions, which are defined respectively by two parallel support bar metal cores, are connected to the spoke portion metal cores.

Other technical concepts can also be appreciated from the above embodiment.

In the steering wheel according to the present invention, projections 26 are formed on the support bar metal core 24 of the steering wheel body 1, and the insert 41 has the retaining holes 45 in which the projections 26 are retainingly held. When the air bag is expanded and deployed, the insert, being wound on the metal core together with the interaction between projections 26 and holes 45 prevents the insert from being displaced out of position because of the retaining effect achieved by the projections and the retaining holes. Stresses developing upon expansion of the air bag, is received by the above retaining effect, so that the cloth insert is prevented from being disengaged from the support bar metal core.

What is claimed is:

1. A steering wheel comprising:

a steering wheel body comprising a boss to be fixed to a steering shaft ;

a ring portion core defining a ring portion plane;

a plurality of spoke portion cores extending from said ring portion core;

at least one connecting portion, each of said at least one connecting portions connecting said boss to one of said plurality of spoke portion cores;

a material integrally covering said ring portion core and said plurality of spoke portion cores, said covering material including a pad portion provided generally centrally of said ring portion core;

an air bag device provided between said pad portion and said boss;

a support bar core portion connecting said boss to at least two of said plurality of spoke portion cores and forming part of said steering wheel body, said support bar core portion having an attachment section which is positioned approximately adjacent to said ring portion plane and which extends along one dimension of said pad portion; and an insert comprising a flexible material attached to said attachment section and embedded in said pad portion so that said insert can flex when said air bag device operates.

2. A steering wheel according to claim 1, in which said insert is folded around said attachment section and overlapped upon itself to provide a double hinge portion, with overlapped portions of said insert being joined together.

3. A steering wheel according to claim 2, in which said insert comprises a cloth.

4. A steering wheel according to claim 2 or claim 3, in which said pad portion further includes a notch portion for assisting said air bag device in expanding, and said insert includes a first portion having a peripheral edge extending along said notch portion, and a second portion folded upon said first portion.

5. A steering wheel according to claim 4, in which said first portion of said insert is disposed below said second portion.

6. The steering wheel of claim 3, wherein the overlapped portions are joined by being sewn together.

7. The steering wheel of claim 2, wherein the double hinge portion is positioned relatively near the ring portion plane.

8. The steering wheel of claim 1, wherein said insert is formed from a single piece of flexible material.

9. The steering wheel of claim 1, wherein the attachment section extends between at least two of the spoke portion cores.

10. The steering wheel of claim 1, wherein the ring portion core, spoke portion cores, at least one connecting portion, and support bar core portion are each comprised of metal.

11. A steering wheel comprising:

a steering wheel body comprising a boss to be fixed to a steering shaft;

a ring portion core defining a ring portion plane;

a plurality of spoke portion cores extending from said ring portion core;

at least one connecting portion, each of said at least one connecting portions connecting said boss to one of said plurality of spoke portion cores;

a material covering said ring portion core and said plurality of spoke portion cores, said material including a pad portion provided generally centrally of said ring portion core;

an air bag device provided between said pad portion and said boss;

a support bar core portion connecting said boss to at least two of said plurality of spoke portion cores and forming part of said steering wheel body, said support bar core portion having an attachment section which is positioned approximately adjacent to said ring portion plane and which extends along one dimension of said pad portion;

an insert comprising a flexible material attached to said attachment section and embedded in said pad portion so that said insert can flex when said air bag device operates, said insert having a distal end with a substantially triangular shape.

12. The steering wheel of claim 8, wherein the ring portion core, spoke portion cores, at least one connecting portion, and support bar core portion are each comprised of metal.

\* \* \* \* \*